April 24, 1951  E. UHLMANN ET AL  2,550,624
MEANS FOR SIMULTANEOUSLY CLOSING A PLURALITY OF CIRCUITS
Filed March 16, 1948
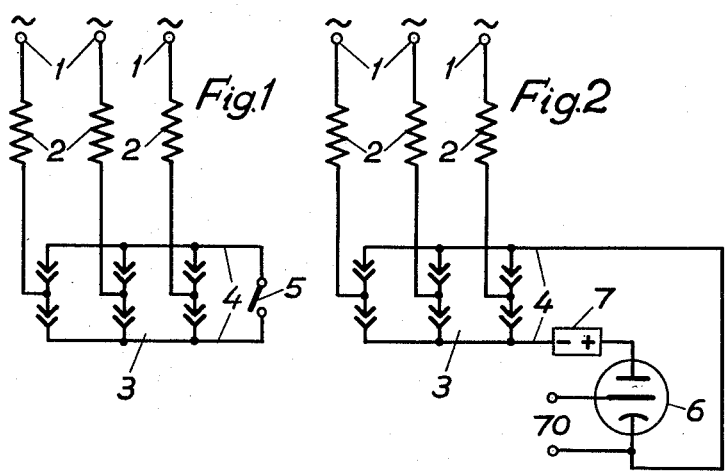
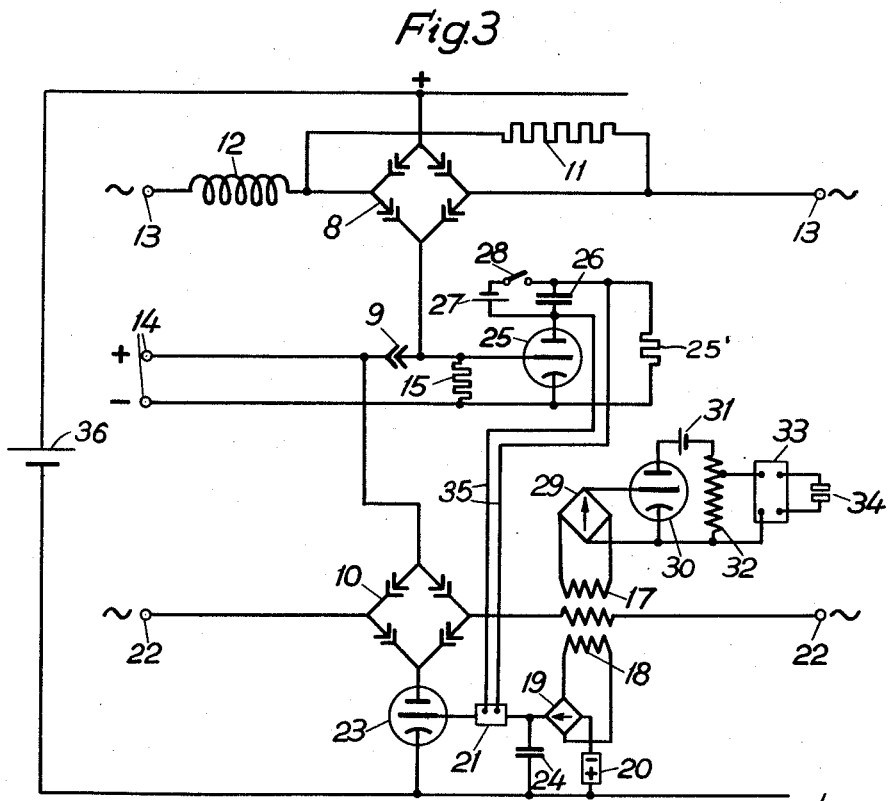
Inventors
Erich Uhlmann
and Johannes Hansen
By James Aiken Attorney Patented Apr. 24, 1951

2,550,624

UNITED STATES PATENT OFFICE 2,550,624

MEANS FOR SIMULTANEOUSLY CLOSING A PLURALITY OF CIRCUITS

Erich Uhlmann, Ludvika, Sweden, and Johannes Hansen, Milwaukee, Wis., assignors to Allmanna Svenska Elektriska Aktiebolaget, Vasteras, Sweden, a Swedish corporation Application March 16, 1948, Serial No. 15,108
In Sweden March 10, 1947

8 Claims. (Cl. 171—97)

The problem of simultaneously closing two or more electric circuits under the influence of a single primarily acting circuit is often presented. In many cases it is a question of a polyphase current, in others of several circuits independent of one another and cooperating for the same purpose. Generally, in such cases, a multi-polar relay is employed which is actuated by the primary circuit. The present invention provides other means for the same purpose, which operate without movable parts and therefore in many cases become more simple than a multi-polar relay and also afford a greater precision as regards the simultaneity of the closing of the different circuits which is important in many cases, for instance if the closing of the primary circuit is effected by a slowly moving contact. The invention is characterized by the primary circuit containing the main current paths of a plurality of stationary electric valve elements, which are connected in the circuits to be closed and so arranged that an operative current cannot flow in these circuits, if the primary circuit is not closed.

Three forms of the invention are diagrammatically illustrated in Figs. 1–3 of the accompanying drawing.

In Fig. 1, I designates the terminals of a threephase current source, to which a threephase load 2, for instance a motor, is connected. In series with the load 2 there is connected a threephase two-way rectifier 3, preferably composed of dry valve elements. Between the direct current terminals 4 of the rectifier, there is a contact 5, which may be closed by hand or automatically, in the latter case for instance under the influence of a temperature or pressure measuring device, if for instance there is a need of starting a fan motor when a temperature has risen above a certain value, or a pump motor when a pressure has decreased below a certain value. Such contacts often have a slow motion, and if the contacts of several circuits should be directly closed in this way, there would in many cases be an appreciable difference of time between them.

When the contact 5 is open, the rectifier acts as an interruption of the threephase circuit, while with a closed contact 5 it acts as a shortcircuited neutral point. The contact 5 then carries the whole motor current and should be dimensioned therefor.

In Fig. 2, the contact 5 is replaced by an electronic or vacuum tube 6, having a current source 7 and a grid voltage source 70. The current is here closed through the threephase load object when the control grid of the tube is put under an appropriate voltage. This form is especially suitable when the current closing shall be very rapid, as the dry valves and the electronic tube operate very rapidly. The electronic tube may be of any ordinary type, for instance a pentode, and may also consist of an ionic (gas-filled) tube, in which case, however, special devices should be provided for interrupting the current therethrough. The arrangement according to Fig. 2 operates substantially in the same manner as that according to Fig. 1.

If the valve elements in the rectifier 3 of Fig. 2 are replaced by symmetrically acting voltage-dependent resistances, their current interrupting action will not be complete, but by choosing a suitable characteristic of these resistances, it is, however, possible to reduce the alternating current to so low a value, when the direct current circuit is interrupted, that for instance the threshold value of an amplifier influence by the threephase current will not be exceeded, and the final result thus in many cases will be the same.

Fig. 3 shows an example of the application of the invention to the control of several circuits independent of one another. In this, the control circuit is formed through a battery 36, and runs through valves 8, 9, 10 and tube 23.

There are three controlled circuits. First is an alternating current circuit 13 containing an impedance 12 and full-wave type rectifier valve 8, the latter being in parallel with a load 11. The purpose of this part of the system may be to cut the load 11 out when welding is taking place if, for example, the other circuits are being used for welding purposes (the method of controlling the welding current is described below). The impedance 12 is so selected that the current in circuit 13 can never exceed that flowing in the control circuit when the latter is closed.

Now when the control circuit is closed, in the manner to be described below, current flows between terminals 13. In one phase current flows from the left-hand terminal 13 through the lower left branch of rectifier 8, valve 9, rectifier 10, tube 23, battery 36, and the upper right branch of rectifier 8 to the right-hand terminal 13. In the other direction of flow, current flows from right-hand terminal 13 through the lower right branch of rectifier 8, then through the same path to the upper left branch of rectifier 8, and to left-hand terminal 13.

Because the current in circuit 13, by reason of impedance 12, can never exceed that in the control circuit, closing of the control circuit will in effect short-circuit and thus disable the load 11.

The two remaining circuits of Fig. 3 cooperate to produce, upon the closing of a switch, a welding current which will continue for a predetermined period and then will be automatically cut off. Load 11 is disabled during this welding period, and then cut back in.

Switch 28 is the manual control by which welding is initiated. This switch is arranged in series with a condenser 26 and battery 27. When switch 28 is closed, battery 27 charges condenser 26, and the voltage from the battery is transmitted by connectors 35 to a device 21 in series with the grid of tube 23. This grid is normally maintained negative by battery 29, but when a sufficient charge has accumulated on condenser 26, it will overcome the charge from battery 29, and will make the grid of tube 23 positive. A current will then flow in the control circuit from the positive terminal of battery 36 through rectifiers 8, 9 and 10, and valve 23 to the negative battery terminal.

Condenser 26 is connected in series with a valve 25 and a resistance 25'. The grid of tube 25 is connected through valve 9 to the positive terminal of direct current source 14, while the negative terminal of this source is connected to the line between valve 9 and the grid of the tube across a resistance 15. Valve 9 normally is non-conducting, and therefore, a negative charge is imposed on the grid, since it is connected through resistance 15 to the negative side of source 14. But when the control circuit is closed, current flows from the positive terminal of source 14 through rectifier 10, tube 23, battery 36, rectifier 8 and resistance 15 to the negative terminal of that source. There will then be a substantial drop in potential across resistance 15, and the grid of tube 25, being connected to the positive side of the resistance 15, will be more positive than the cathode which is connected to the negative side of the resistance.

Valve 25 will then become conducting and will close the circuit from condenser 26 through the resistance 25'. The charge on condenser 26 will then gradually be discharged, the rate of discharge depending on the value of the resistance. The significance of this discharge will be explained below.

Closure of the control circuit also allows the flow of current between terminals 22, through rectifier 10, valve 23, battery 36, rectifier 8, valve 9 and rectifier 10. Circuit 22 includes the primary of a transformer which has secondaries 17 and 18. Current induced in coil 17 is rectified by rectifier 29 to impose a positive charge on the grid of tube 30 which is in series with battery 31 and resistance 32, and thus allows a flow of current in this circuit. This current flow is amplified conventionally by device 33 and feeds welding electrodes 34. Thus as long as a current flows in circuit 22 (and, since the flow of current in this circuit is dependent on a flow through the control circuit, as long as the control circuit is closed) welding will continue.

Obviously, as soon as the control circuit is closed, the condenser 26 begins to discharge and the positive charge on the grid of tube 23 from this condenser begins to drop. In the absence of some other arrangement, this would cause practically instantaneous reopening of the control circuit. To ensure the maintenance of the circuit for the necessary length of time, the secondary 18 of the transformer in line 22 is connected by rectifier 19 to impose a positive charge on the grid of tube 23 supplementing the charge from condenser 26. This charge is not sufficient, however, of itself to overcome the negative charge from battery 29.

Assuming now that battery 29 gives a negative charge of 30 volts, condenser 26 must be charged to, say 40 volts to render tube 23 conducting, and secondary 18 supplies a positive charge of 20 volts. Then as soon as switch 28 has been closed long enough to charge condenser 26 to 40 volts, and circuit 22 is closed, there will be a charge of 60 volts, or an excess of 20 volts, on the grid of tube 23. But as the condenser discharges to less than 20 volts, the total positive charge from the condenser and from the secondary 18 will drop below 40 volts, the positive charge necessary to maintain tube 23 conducting. When this occurs, the control circuit will be broken at valve 23 and the opening of this circuit will break circuit 22, so that no current is provided in transformer secondary 17 and no positive charge to the grid of tube 30. This tube now becomes non-conductive, disconnecting battery 31 and causing the end of the welding operation. At the same time, the short circuit 8 in the circuit 13 is opened, and current flow through load 11 is resumed.

When switch 28 is again closed, these operations are repeated.

We claim as our invention:

1. Electric circuit closing means for simultaneously opening and closing a plurality of electric circuits, comprising a plurality of electric circuits, unilaterally conducting valve means in each of such circuits normally preventing the flow of current therein, at least one of such circuits being an alternating current circuit, the valve means in any alternating current circuit including at least two oppositely directed valve elements, a control circuit containing all such valve means, the elements of each such valve means passing current in the same direction through the control circuit, and means to open and close the control circuit, whereby operation of said last means simultaneously opens and closes all said circuits.

2. Electric circuit closing means for simultaneously opening and closing a plurality of electric circuits, comprising a plurality of electric circuits, unilaterally conducting valve means in each of such circuits normally preventing the flow of current therein, at least one of such circuits being an alternating current circuit, the valve means in any alternating current circuit including a bridge rectifier, a control circuit containing all such valve means, the elements of each such valve means passing current in the same direction through the control circuit, and means to open and close the control circuit, whereby operation of said last means simultaneously opens and closes all said circuits.

3. In a device as claimed in claim 1, means to force a direct current through said control circuit in the direction permitted by said valve means.

4. In a device as claimed in claim 3, said current forcing means including a direct current source in the control circuit.

5. Electric circuit closing means for simultaneously opening and closing the three circuits of a three-phase line, comprising three circuits of a three-phase line, unilaterally conducting valve means in each of such circuits normally preventing the flow of current therein, each such valve means including two oppositely directed valve elements, a control circuit containing all such valve means, the elements of each such valve means passing current in the same direction through the control circuit, and means to open and close the control circuit, whereby operation of said last means simultaneously opens and closes all said circuits.

6. In a device as claimed in claim 1, said control circuit opening and closing means comprising an electronic tube in the control circuit.

7. In a device as claimed in claim 6, said tube having a control grid, and means operatively connecting said grid with one of said circuits for controlling the potential of the grid in response to variations of the current in such circuit.

8. In a device as claimed in claim 1, a timing device connected in one of said circuits, means operatively connecting said timing device to another of said circuits to control the flow of current therein, and a welding device operatively connected with said last circuit.

ERICH UHLMANN.
JOHANNES HANSEN.

REFERENCES CITED

The following references are of record in the file of this patent:

UNITED STATES PATENTS

| Number | Name | Date |
| --- | --- | --- |
| 2,407,072 | Gittings et al. | Sept. 3, 1946 |
| 2,431,262 | Longini | Nov. 18, 1947 |
| 2,435,187 | Bedford | Feb. 3, 1948 |